United States Patent [19]

Ashar et al.

[11] 3,800,193

[45] Mar. 26, 1974

[54] MAGNETIC SENSING DEVICE

[75] Inventors: Kanu G. Ashar, Wappingers Falls; James Overmeyer, Poughkeepsie, both of N.Y.

[73] Assignee: International Business Machines Corporation, Armonk, N.Y.

[22] Filed: Sept. 5, 1972

[21] Appl. No.: 285,990

[52] U.S. Cl. .......................... 317/235 R, 317/235 H
[51] Int. Cl. .......................... H01l 19/00
[58] Field of Search .......................... 317/235, 317/23

[56] References Cited

UNITED STATES PATENTS

| | | | |
|---|---|---|---|
| 3,667,000 | 5/1972 | Bergmans | 317/235 |
| 3,522,494 | 8/1970 | Bosch | 317/235 |
| 3,596,114 | 7/1971 | Maupin et al. | 307/278 |
| 3,305,790 | 2/1967 | Parsons et al. | 330/6 |

*Primary Examiner*—Rudolph V. Rolinec
*Assistant Examiner*—E. Wojciechowicz
*Attorney, Agent, or Firm*—Henry Powers

[57] ABSTRACT

A magnetic sensing head responsive to the magnetic flux variations of a relatively moving magnetic carrier in which a magnetic yoke or core is formed as a film coated on a semiconductor substrate, and having a gap disposed about a flux sensitive device to place it in series magnetic circuit. The flux sensitive device, such as Hall-effect element, magnetodiode, magnetoresistor and the like, is integrated with the semiconductor substrate as by being formed within a segment thereof.

25 Claims, 27 Drawing Figures

MAGNETIC SENSING DEVICE

BACKGROUND OF THE INVENTION

1. Field of the Invention

This invention relates to the field of magnetic sensing devices for sensing magnetic information or data recorded on magnetic carriers such as tapes, drums discs and the like.

The uses of varied magnetic flux responsive devices have extensive application in the arts, as represented by magnetodiodes, magnetoresistors, Hall-effect devices and the like. Illustrative of such applications is the use of Hall-effect devices in transducer heads adapted for sensing information recorded in a magnetic carrier such as tape, drum, disc and the like. Typically, such a transducer head or pickup includes a magnetically permeable yoke formed from a pair of pole pieces assembled to form a front gap which picks up a signal flux from a magnetic recording, and a rear gap aligned, in series magnetic circuit, with one axis of a Hall-effect member along which it is subjected to the magnetic flux. The Hall-effect member is provided, at spaced points along a second perpendicular axis with current electrodes , for passage of current, with the voltage along this axis sensed at output terminals to provide an output signal proportional to the current and the applied magnetic field. The output signal represents a flux responsive reproduction of the magnetic recording on the carrier used. Normally, the operating current flow through the Hall-effect member may be D. C. source, or a carrier frequency source of alternating-current amplification is to be employed.

Heretofore, such transducer heads or pickups have been fabricated by assembly of preformed components which necessitate the requirement of extreme care in the alignment and unification of the components. However, mechanical tolerances inherent in the fabrication of the individual components, are reflected in the final assembled transducer, detracting from the response of the unit.

SUMMARY OF THE INVENTION

Generally speaking, the invention comprehends a transducer adapted for fabrication directly into integrated form utilizing conventional semiconductor technology. This may be accomplished by forming the magnetic flux responsive element, as well as support circuitry therefor, directly in a semiconductor substrate, followed by coating a magnetic yoke, as a film, on the substrate in series magnetic circuit with the element. The fabrication of the transducer includes provision for forming the yoke to include two pole portions provided with a flux sensing or pick-up gap in the submicron range.

Accordingly, it is an object of this invention to provide a novel magnetic transducer.

It is another object of this invention to provide a novel magnetic transducer utilizing planar semiconductor technology for the fabrication thereof.

The foregoing and other objects, features, and advantages of the invention will be more apparent from the following more particular description of the preferred embodiments of the invention as illustrated in the accompanying drawings.

DESCRIPTION OF THE PREFERRED EMBODIMENTS

Although various magnetic flux sensitive elements can be employed in the present invention, the invention will be described, for purposes of illustration, in conjunction with a Hall-effect element previously employed in the art for reproducing magnetic recording from a tape, drum, wire, disc and the like. The same general type of sensing of recorded information, on a magnetic carrier, is contemplated for application of the Hall-effect transducer in this embodiment of the invention.

Figure 1A:
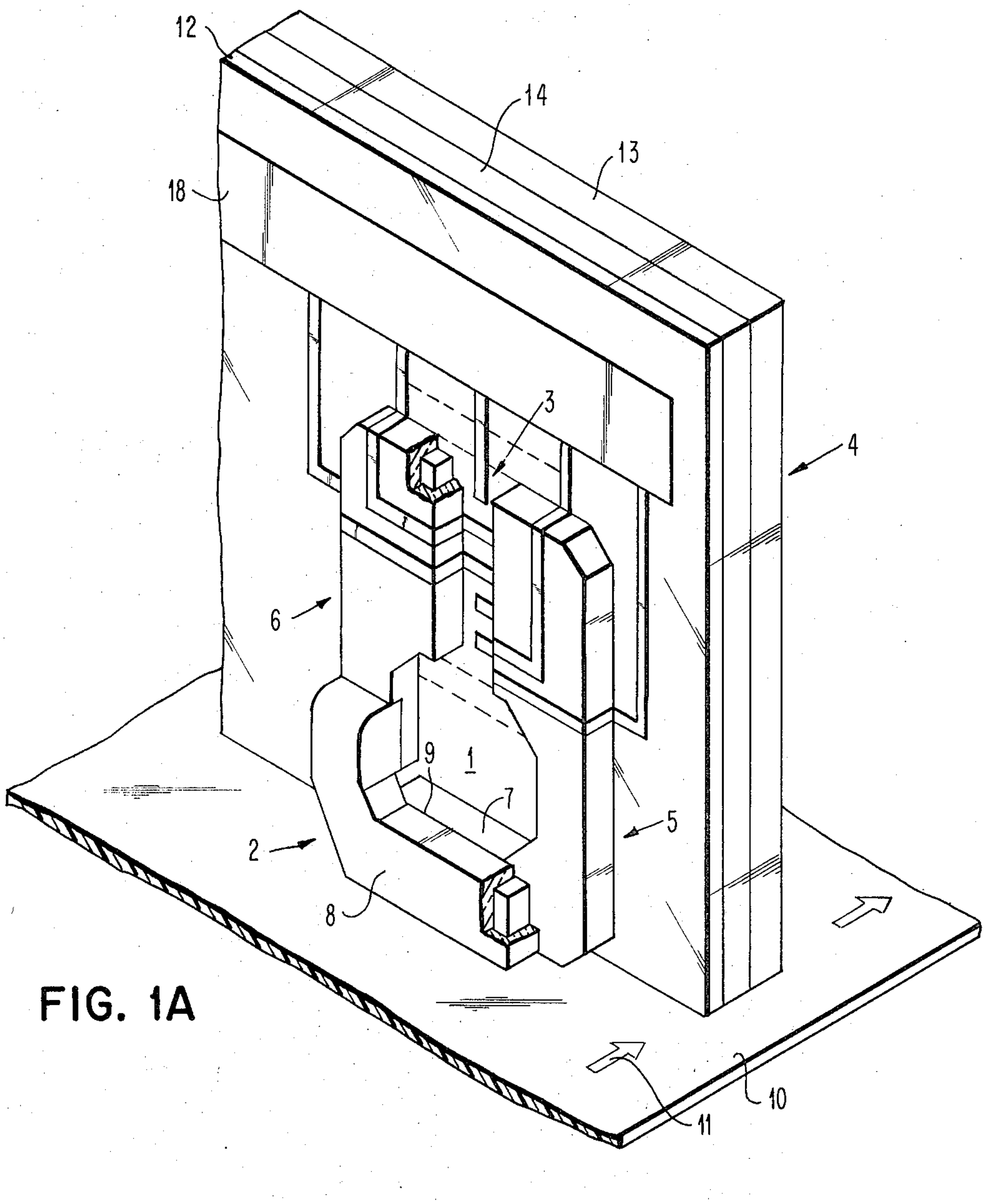
FIG. 1A is a perspective view of a fragmentary portion of a multichannel array of one embodiment of the magnetic transducer of this invention.
Figure 1B:
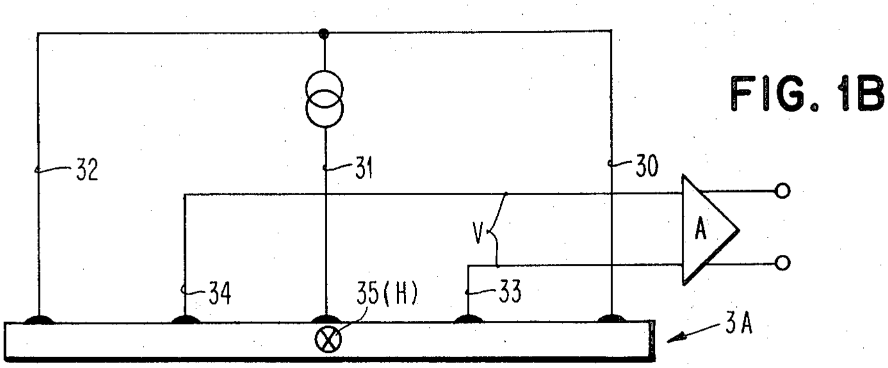
FIG. 1B is a schematic illustration of the relationship of the terminal of this embodiment to support circuitry therefor.

FIG. 1 illustrates one form of this embodiment of the invention in which the transducer 1 comprised of a magnetic yoke 2 and a Hall-effect element 3, representative of the magnetic flux responsive elements, are integrated on a semiconductor substrate 4. Such substrates, for example, may be silicon, a semiconductor material representative of the various conventional semiconductor materials which are equally applicable, as for example, germanium, indium antimonide, indium arsenide and the like.

Figure 5:
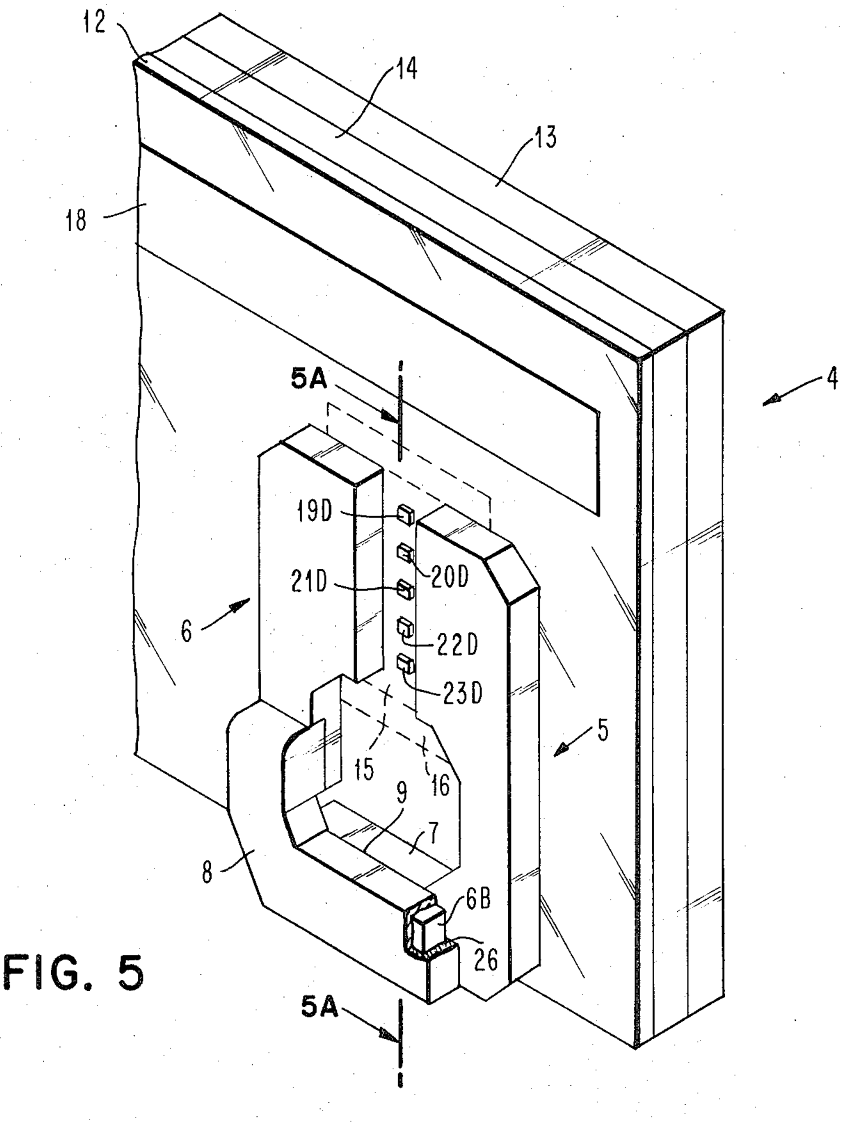
Figure 5A:
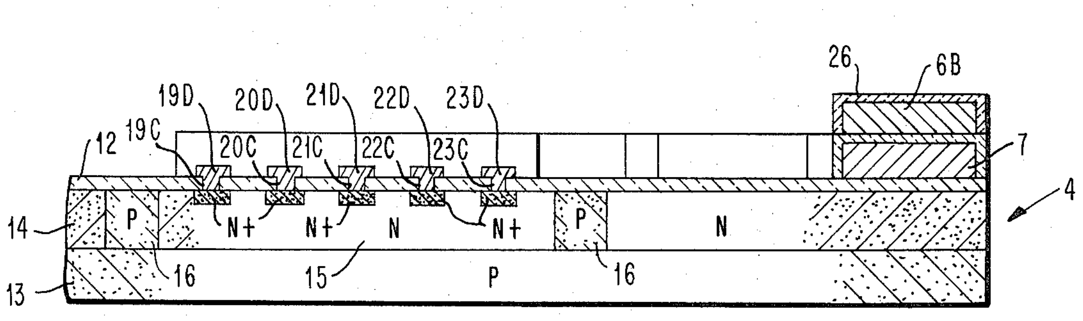

The yoke 2 in its conventional relationship includes a pair of pole pieces 5 and 6 having overlapping end portions 7 and 8 defining a non-magnetic gap 9 (see also FIGS. 5 and 5A) for coupling of the yoke to the signal flux of a magnetic record carrier such as a magnetic tape 10 which is moved past the yoke gap 9 in the direction of arrow 11 by a conventional tape drive.

The yoke 2 comprises a layer of magnetically permeable material, such as ferrite, coated on the top surface of a dielectric material such as an oxide layer 12 formed, in this instance, by oxidation of a silicon semiconductor base. This semiconductor base, of substrate 1 may typically comprise a layer 13 of silicon doped to a conductivity of one type, as for example, P-type, over which is grown an epitaxial layer 14 of silicon having an opposite type conductivity, as for example, N-type in which the Hall-effect flux responsive element 3 is formed for subsequent placement in series magnetic circuit at the rear gap of pole pieces 5 and 6.

Figure 2A:
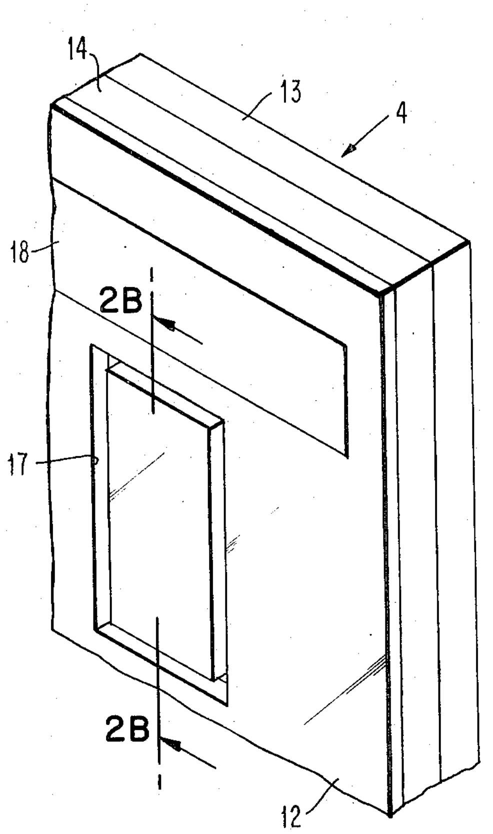
FIGS. 2A through 6 illustrate various stages in the fabrication of the embodiment of FIG. 1A.

The Hall-effect element 3 may be formed in the substrate 4 by conventional semiconductor fabrication techniques which are illustrated in the series of drawings beginning with FIG. 2A. Typically, a semiconductor (such as silicon) base substrate 13, of one conductivity type, as for example, P-type, is provided, by epitaxial growth, diffusion or ion implantation, with a functional layer 14 of opposite conductivity type, as for example N-type, and the resultant structure secured, as by oxidation, with a dielectric oxide layer 12.

Figure 2B:
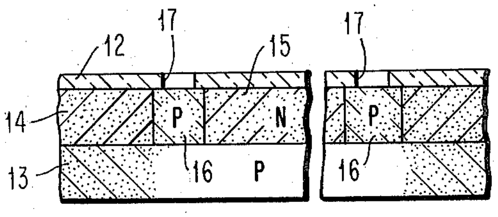
Figure 3B:
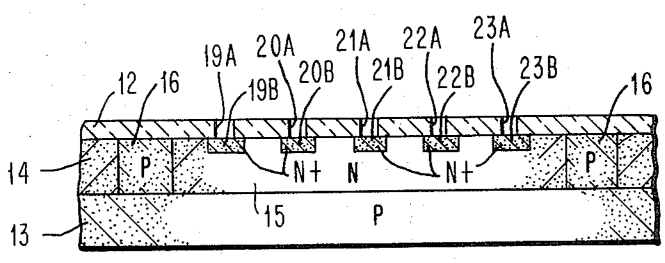

The fabrication of the Hall-effect element is effected within a segment 15 of the functional layer 14, delineated within an isolation ring 16. In the fabrication of this embodiment, the isolation ring can be obtained by photolithographically forming a corresponding opening 17 through the oxide layer 12 to the functional layer 14 in which a P-type diffusion is made for extension to the base P-type layer 13, (see FIG. 2B), followed by reoxidation of the structure to reform the oxide layer 12 in the opening 17. As is conventional in the semiconductor art, such photolithographic techniques comprise coating the top surface of oxide layer 12 with a photoresist material which is selectively exposed in a pattern defining, after development, a corresponding opening pattern through the resist at the oxide portions of the oxide which are to be removed to provide access for diffusion into the semi-conductor substrate. After oxide etching, the photoresist may be stripped with appropriate solvent.

Alternately, as will be appreciated, the isolation ring 16 can be formed, if desired, by etching a moat in the functional layer 14 to the base layer 13, and depositing an oxide fill for isolation of the functional layer segment 15 within the substrate 4. It is to be understood that although the fabrication of a single Hall-effect element is referred to, a multiplicity of such elements may be concurrently fabricated in accordance with the usual practices in the semiconductor art. Also, it is to be noted that concurrently with the fabrication of the Hall-effect element 3, the usual support circuitry, for current supply and amplification of sensed voltage variations, can be integrated in a segment 18, of semiconductor substrate 14 with conventional techniques well known in the semiconductor art; and accordingly neither any specific circuitry nor a description of the fabrication thereof is specifically set for herein.

Figure 3A:
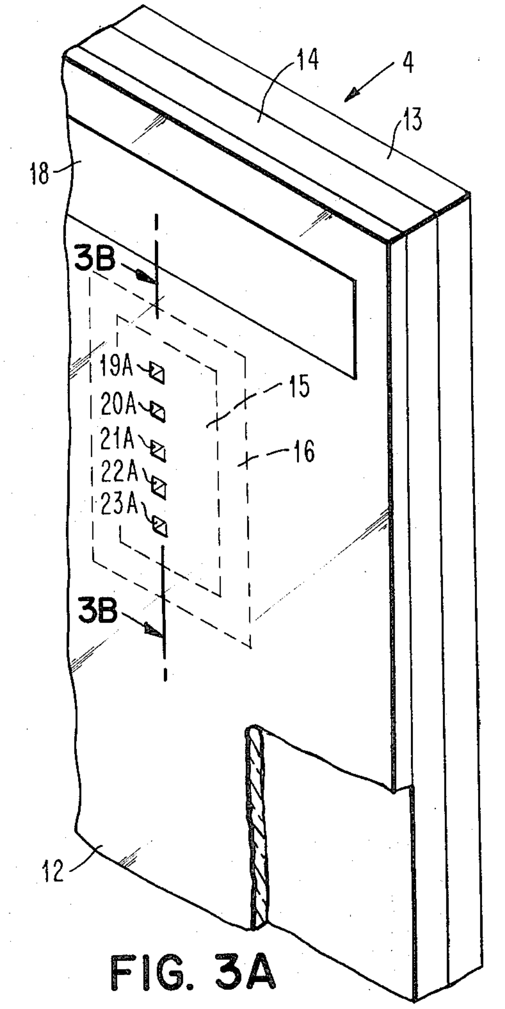

In the next operation, as more clearly shown in FIG. 3A, photolithographic techniques are again employed to form a plurality of openings 19A, 20A, 21A, 22A and 23A for diffusion of a higher concentration of N-type impurities into the functional layer segments 15 to form corresponding N+ regions 19B, 20B, 21B, 22B and 23B at points where electrodes of the Hall-effect element 3 are to be located.

After diffusion, the structure may be again reoxidized to reform the oxide over the exposed functional layer segment 15 in openings 19A to 23A.

Figure 4A:
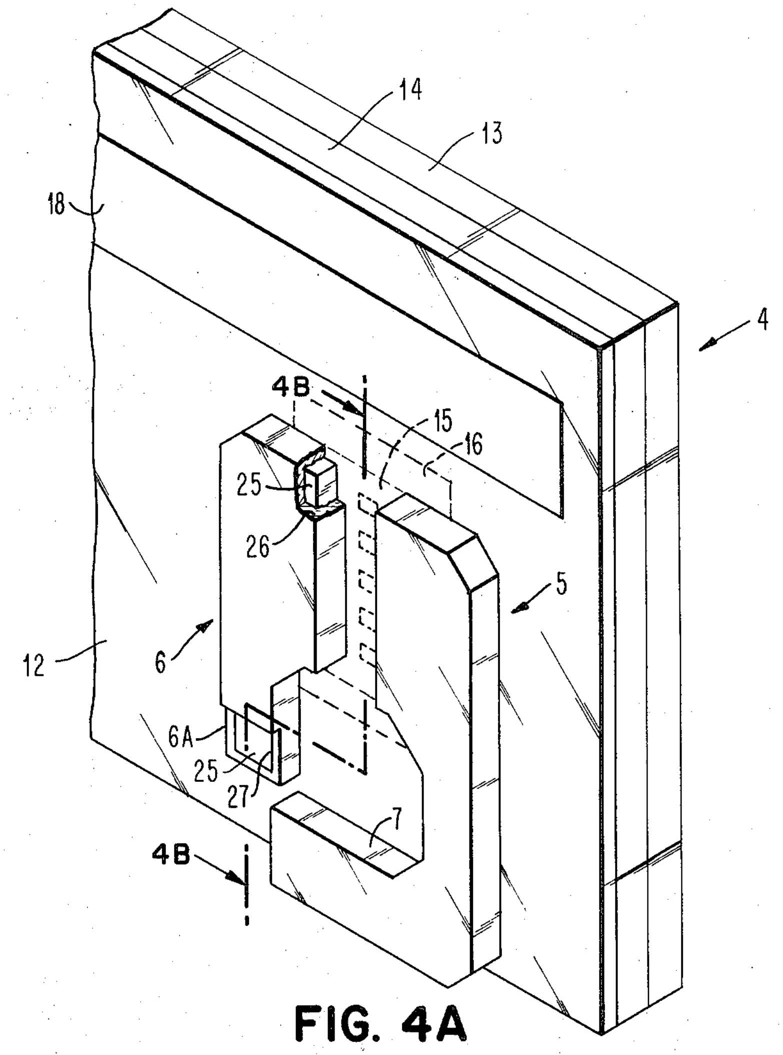
Figure 4B:
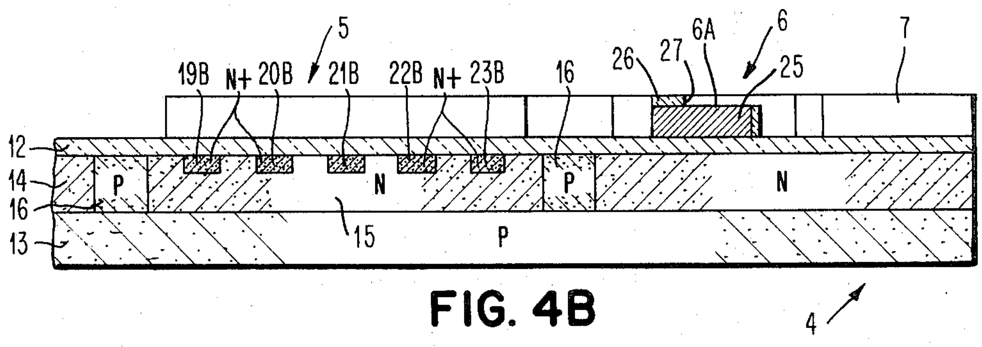

After this last reoxidation of the unit, a magnetic film 25 of any suitable magnetic material is coated over oxidized layer 12 by conventional deposition, electroforming, sputtering or evaporation techniques, in a pattern forming pole piece 5 and a portion 6A of pole piece 6 as more clearly shown in FIG. 4A. As shown in the drawing, the pole section 5 and 6A define a rear gap adjacent functional layer segment 15 so as to place the Hall-effect element 3 in series magnetic circuit within the gap which also gives access to diffused regions 19B to 23B for subsequent formation of the conductor pattern and terminals of the Hall-effect element 3.

After deposition of the pole sections 5 and 6A, another oxide layer 26 is formed over the section whose thickness defines the front gap 9 and which may be of the order of 5,000 Angstroms. In a following operation a via-hole 27 is formed in the oxide layer over pole section 6A to form a continuous magnetic path to a pole section 6B formed in an additional deposition of a magnetic film to complete the formation of pole 6. The structure is then coated with an electrically insulating layer, e.g. silicon dioxide or silicon nitride, which will serve as a support for a coated film pattern of conductors interconnecting the Hall-effect element 3 and the support circuitry 18.

For this purpose, via-holes 19C, 20C, 21C, 22C and 23C are photolithographically formed through the oxide coating for forming electrical contacts 19D, 20D, 21D and 23D to the corresponding N+ regions 19B to 23B in the Hall-effect element 3 previously formed in the functional layer segment 15. The conductor pattern is formed by conventional thin film techniques which comprise metallization and etching a desired pattern of the film which is photolithographically delineated. The conductor pattern includes current lines 30, 31 and 32 and voltage sense lines 33 and 34 whose relationship is schematically shown in the simple explanatory push-pull circuit of FIG. 1B. In such a circuit, current enters the center electrode 31 and is distributed toward the two current electrodes 30 and 32. When a magnetic field H is applied to the Hall-effect element 3A in a direction perpendicular to the drawing, as indicated at 35 a Hall voltage V is developed between voltage electrodes 33 and 34 at which the variation in voltage (proportional to flux variation) may be suitably amplified for reproduction of the information sensed in a magnetic carrier.

Final passivation of the resultant transducer may be obtained by a final coating of a dielectric or insulating film (e.g. silicon oxide, silicon nitride, glass and the like) over the exposed conductor pattern and other areas of the functional components of the unit.

Figures 6, 7:
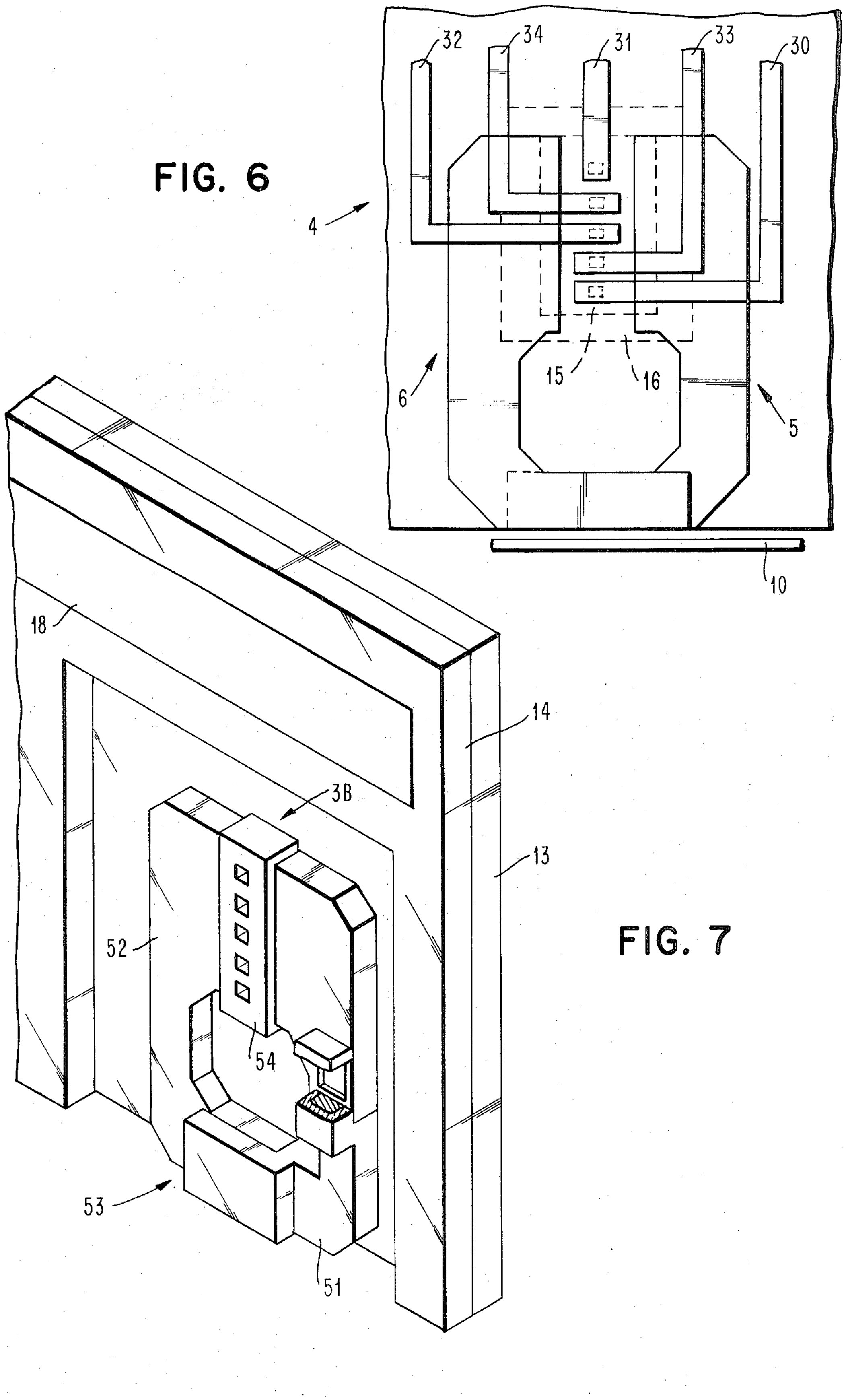
FIG. 7 is a perspective view of a portion of a multichannel array of another embodiment of the magnetic transducer of this invention.

FIG. 7 illustrates another embodiment of this invention in which a Hall-effect element 3B is fabricated on a mesa 54 formed by etching away undesired portions of the functional layer 14. The yoke film 53 is then coated on the substrate so that the pole pieces 51 and 52 define a rear gap disposed in-line with the side walls of mesa 54, e.g., the Hall-effect element 3B.

Figure 7A:
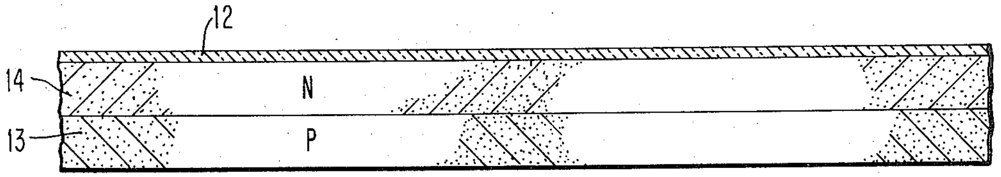
FIGS. 7A to 7E illustrate various stages in the fabrication of the embodiment of FIG. 7.
Figure 7B:
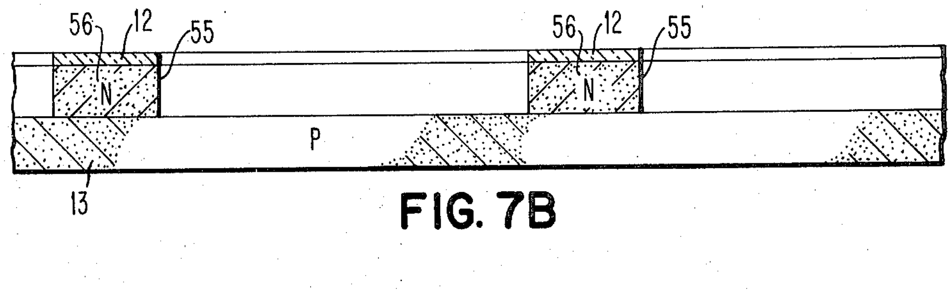
Figure 7C:
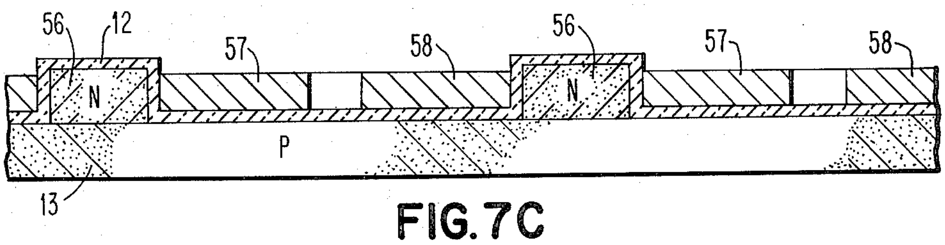
Figure 7D:
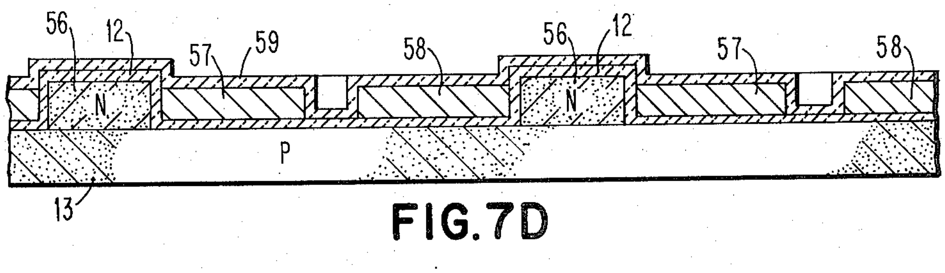
Figure 7E:
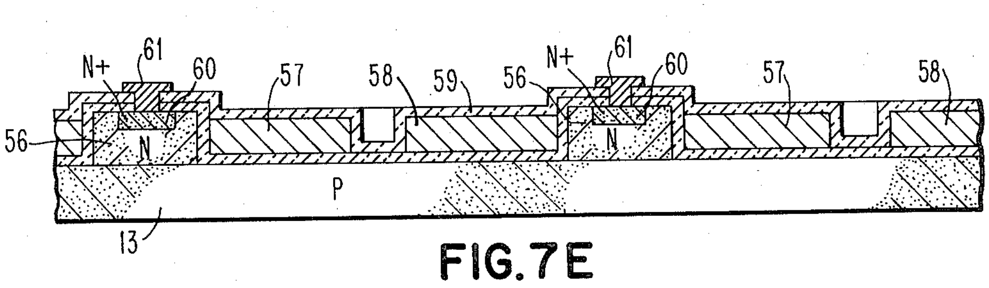

FIGS. 7A to 7E illustrate the fabrication of a modification of this embodiment in which a magnetic field is also provided in a direction perpendicular to the current path. The basic steps of fabrication are substantially the same as described above, including the etching of a moat 55 about a segment 56 of the functional N-type layer 14. The walls of moat 55 are oxidized, as shown in FIG. 7C, followed by deposition of pole pieces 57 and 58 whose rear-gap defining end portions are extended into the oxidized moat adjacent the functional N-type layer segment 56, followed by deposition of an insulating layer 59 (e.g., of silicon oxide as by sputtering) through which a via-hole is formed for diffusion of an N+ region 60 and formation of current and voltage terminals 61.

Figures 8A, 8B:
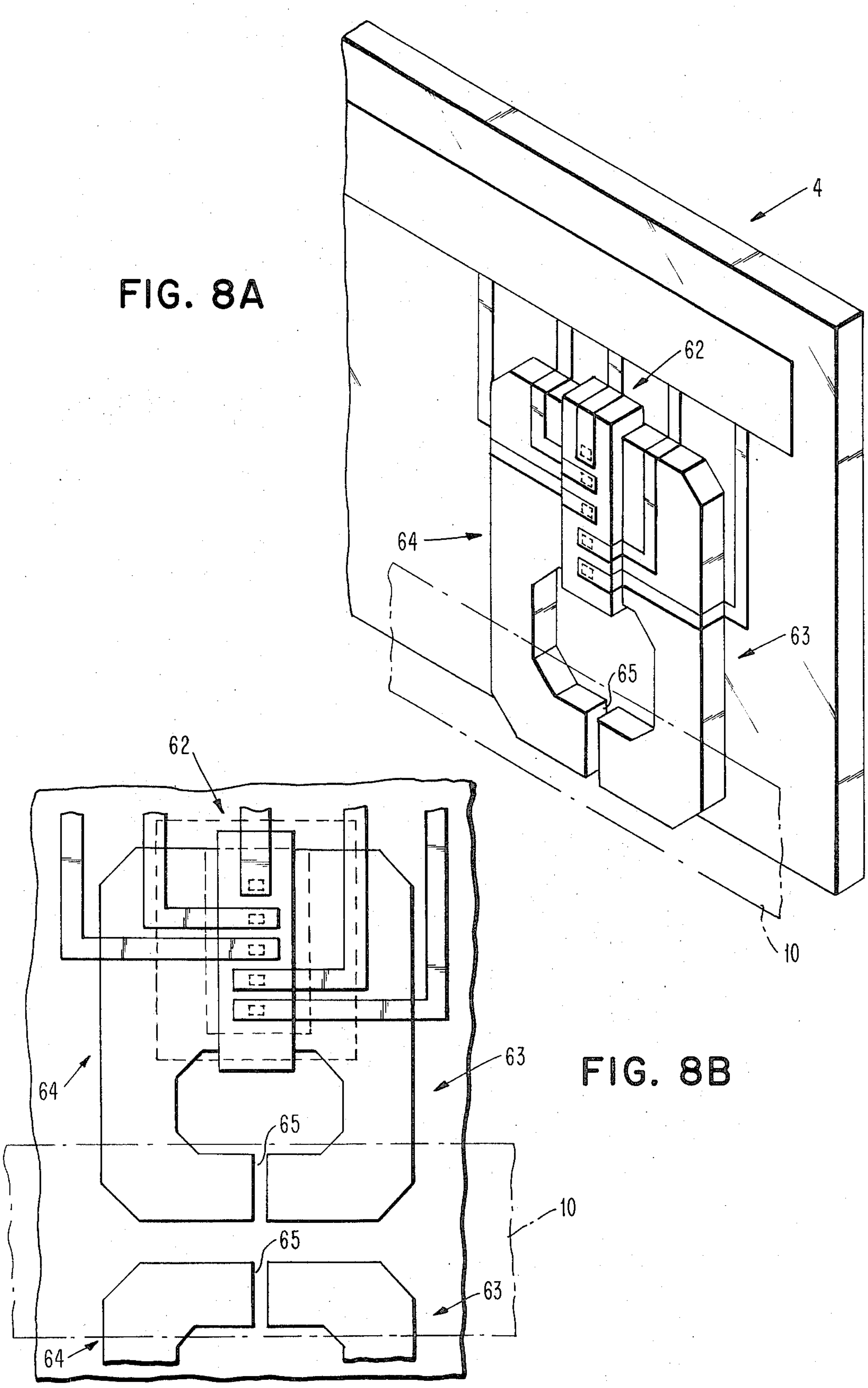
FIGS. 8A and 8B illustrate further embodiments of the magnetic transducer heads of this invention.

FIG. 8A illustrates another embodiment of this invention having a horizontal head configuration. In this embodiment, the Hall-effect element 62 is shown in a mesa configuration, with pole pieces 63 and 64 deposited to define a gap 65 perpendicular to the plane and an edge of substrate A. The pole pieces 63 and 64 may be formed in a single piece whose gap 65 may be formed by photolithographic and etching techniques.

FIG. 8B shows the adaption of this embodiment to multichannel operation, in which a plurality of the transducers can be formed with their gaps disposed for tracking a plurality of recorded channels of a magnetic carrier.

Figure 9A:
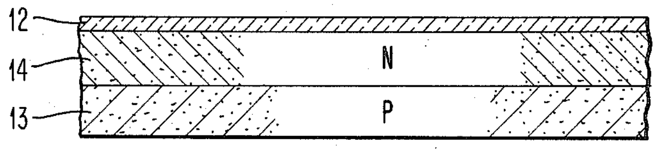
FIGS. 9A through 9H illustrate various stages in the fabrication of a still further embodiment of the magnetic transducer head of this invention.
Figure 9B:
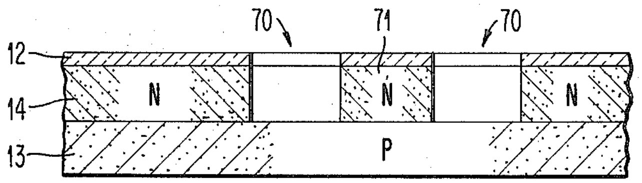
Figure 9C:
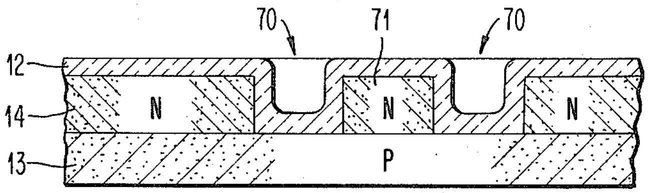
Figure 9D:
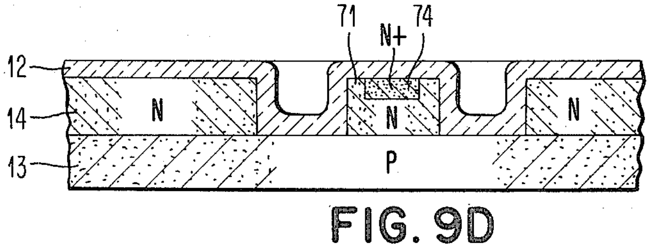
Figure 9E:
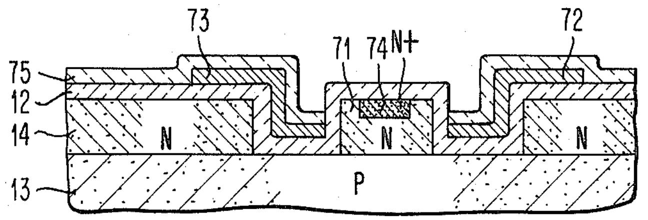
Figure 9F:
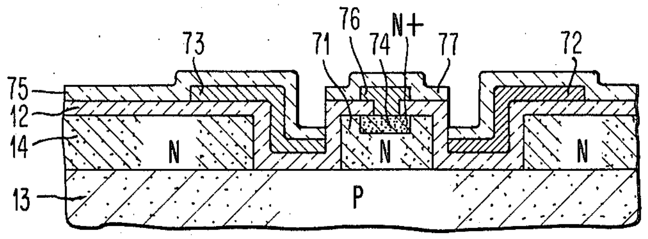
Figure 9G:
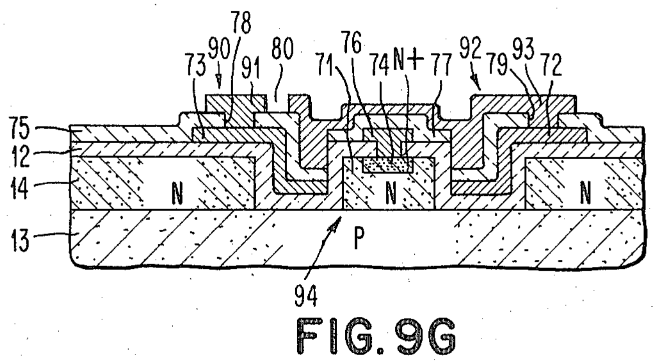

FIGS. 9A to 9H show the fabrication steps for another embodiment of a horizontal head configuration. For this embodiment, an isolation moat 70 is formed and oxidized about a segment 71 of the functional N-type layer 14. After oxidation, a via-hole is formed for diffusion of an N+ region 74 in the functional N-type layer segment 71, followed by reforming of the oxide in the via-hole. Bottom pole 72 and 73 are deposited on the oxide layer 12 with extension into the oxidized moat 70 adjacent the Hall-effect segment 71, followed by deposition of an insulating layer 75 in which a via-hole is formed for metallization of terminals 76 and a conductor pattern overcoated with a deposited insulated layer 77. Via-holes 78 and 79 are then formed in insulating layer 75 to form a continuous path from the bottom poles 72 and 73 to a subsequent deposit of a top magnetic film which may by photolithographic and etching techniques be provided with either gap 80, as located in FIG. 9G, or gap 81, as located in FIG. 9H, each providing discrete top pole pieces in magnetic continuity with a respective one of bottom pole pieces 72 and 73. In the modification of FIG. 9G, one yoke is comprised of top yoke piece 90 in magnet continuity with bottom yoke piece 73 through the yoke segment 91 in via-hole 78 which had been formed in insulating layer 75, and conversely, the second yoke comprised of top yoke piece 92 in magnetic continuity with bottom yoke piece 72 through the yoke segment 93 in via-hole 79 which had been formed in insulating layer 75. In this configuration, top yoke pieces 90 and 92 define the flux pickup gap 80 placed in series magnetic circuit the Hall-effect element 94 (fabricated in the functional layer segment 71) disposed within a rear yoke gap formed by bottom pole pieces 72 and 73.

Figure 9H:
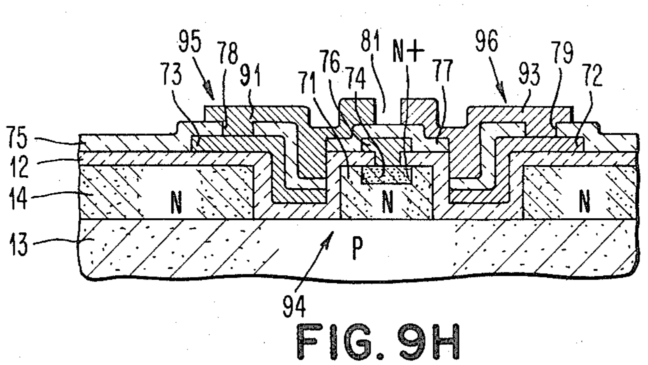

In similar manner relative to the modification of FIG. 9H, one yoke is formed of top yoke section 95 in magnetic continuity with bottom yoke section 73 through the yoke segment 91 in via-hole 78, which had been formed in insulating layer 75; and, conversely, the second yoke comprises the top yoke section 96 in magnetic continuity with bottom yoke section 72 through the yoke segment 93 in via-hole 79 previously formed in insulating layer 75. In this configuration, top yoke sections 95 and 96 define the flux pickup gap 81 in series magnetic circuit with the flux responsive element 94 disposed with the rear gap formed by bottom pole sections 72 and 73.

It is to be noted that although the foregoing has described the coating of magnetic films, such as ferrite, directly on the supporting substrate 4, such films, as for example, permalloy, may be formed by electrodeposition by providing a preliminary metal underlay, such as copper, with the yoke defined by photolithographically removing the excess metal portion in the required pattern.

While the invention has been particularly shown and described with reference to a preferred embodiment thereof and applications therefore, it will be understood by those skilled in the art that various changes in form and details may be made therein and the invention employed for various applications without departing from the spirit and scope of the invention.

What is claimed is:

1. A magnetic transducer comprising
A. a semiconductor substrate;
B. a magnetic flux responsive element integrated with said substrate and having terminals adapted for connection to support circuitry therefor; and
C. a layer of flux permeable means coated on said substrate and spaced to define
a. a flux pickup front gap therebetween, and
b. a rear gap disposed about a pair of opposite sides of said element to place said element in series magnetic circuit with said flux pickup gap.

2. The transducer of claim 1 wherein said element comprises a Hall-effect member.

3. The transducer of claim 2 wherein said Hall-effect member comprises a discrete segment of said substrate.

4. The transducer of claim 1 wherein said support circuitry is integrated with said substrate in electrical connection with the said terminal of said element.

5. The transducer of claim 4 wherein said element comprises a Hall-effect member.

6. The transducer of claim 5 wherein said Hall-effect member comprises a discrete segment of said substrate.

7. The transducer of claim 4 wherein said support circuitry comprises an integrated circuit within a discrete segment of said substrate.

8. The transducer of claim 7 wherein said element comprises a Hall-effect member.

9. The transducer of claim 8 wherein said Hall-effect member comprises a second discrete and spaced segment of said substrate.

10. A magnetic field responsive device comprising:
A. a semiconductor substrate;
B. a magnetic flux responsive device integrated with said substrate and having terminals adapted for connection to support circuitry therefor;
C. a magnetic flux sensing core means comprising a magnetic permeable film coated on said substrate and having a gap disposed about a pair of opposite sides of said element to place it in series magnetic circuit in said core means.

11. The device of claim 10 wherein said substrate comprises:
A. a layer of a first conductivity type semi-conductor material,
B. an epitaxial layer of said material of an opposite conductivity type;
C. an isolation ring in said epitaxial layer circumscribing a segment thereof containing said device; and
D. a dielectric layer
a. on said epitaxial layer and
b. having said film coated thereon.

12. The device of claim 11 wherein said isolation ring comprises a corresponding region of said first conductivity type
A. in said epitaxial layer and
B. extending to said layer of first conductivity type material.

13. The device of claim 10 wherein said element comprises a Hall-effect member.

14. The device of claim 13 wherein said Hall-effect member comprises a discrete segment of said substrate.

15. The device of claim 10 wherein said support circuitry is integrated with said substrate in electrical connection with the said terminal of said element.

16. The device of claim 15 wherein said element comprises a Hall-effect member.

17. The device of claim 16 wherein said Hall-effect member comprises a discrete segment of said substrate.

18. The device of claim 15 wherein said support circuitry comprises an integrated circuit within a discrete segment of said substrate.

19. The device of claim 18 wherein said element comprises a Hall-effect member.

20. The device of claim 19 wherein said Hall-effect member comprises a second discrete and spaced segment of said substrate.

21. The device of claim 11 wherein said element comprises a Hall-effect member.

22. The device of claim 11 wherein said support circuitry is integrated with said substrate in electrical connection with the said terminal of said element.

23. The device of claim 22 wherein said element comprises a Hall-effect member.

24. The device of claim 22 wherein said support circuitry comprises an integrated circuit within a discrete segment of said substrate.

25. The device of claim 24 wherein said element comprises a Hall-effect member.

* * * * *